US007103615B2

(12) United States Patent
Moffatt

(10) Patent No.: US 7,103,615 B2
(45) Date of Patent: Sep. 5, 2006

(54) PROCESS EVALUATION DISTRIBUTED SYSTEM

(75) Inventor: Christopher L. Moffatt, Orlando, FL (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 10/201,730

(22) Filed: Jul. 23, 2002

(65) Prior Publication Data
US 2004/0019616 A1    Jan. 29, 2004

(51) Int. Cl.
*G06F 7/00*   (2006.01)

(52) U.S. Cl. .......................... 707/104.1; 707/2; 707/4; 707/5; 707/8; 707/10; 707/205

(58) Field of Classification Search ................ 345/1.1, 345/173, 348, 189; 705/1, 2, 7, 10, 34, 45, 705/52; 707/1, 3, 10, 101, 102, 104.1, 200, 707/201, 8, 2, 4, 5, 205; 709/203, 206, 219, 709/223, 224, 449; 715/810, 862
See application file for complete search history.

(56) References Cited

U.S. PATENT DOCUMENTS 5,384,910 A *   1/1995   Torres ........................ 715/810
5,764,509 A     6/1998   Gross et al.
5,765,138 A     6/1998   Aycock et al.
6,553,412 B1*   4/2003   Kloba et al. ................ 709/219
6,670,934 B1*  12/2003   Muoio et al. ................ 345/1.1

* cited by examiner

*Primary Examiner*—Shahid Alam
*Assistant Examiner*—Fred Ehichioya
(74) *Attorney, Agent, or Firm*—Ingrassia Fisher & Lorenz, P.C.

(57) ABSTRACT

The distributed system includes a database server, an administration module, a process evaluation module, and a data display module. The administration module is in communication with the database server for providing observation criteria information to the database server. The process evaluation module is in communication with the database server for obtaining the observation criteria information from the database server and collecting process data based on the observation criteria information. The process evaluation module utilizes a personal digital assistant (PDA). A data display module in communication with the database server, including a website for viewing collected process data in a desired metrics form, the data display module also for providing desired editing and modification of the collected process data. The connectivity established by the database server to the administration module, the process evaluation module, and the data display module, minimizes the requirement for manual input of the collected process data.

14 Claims, 3 Drawing Sheets

PROCESS EVALUATION DISTRIBUTED SYSTEM

STATEMENT REGARDING FEDERALLY SPONSORED RESEARCH OR DEVELOPMENT

The invention described herein was made in the performance of work under NASA Contract Number NAS9-20000, subcontract number 1970483303, and is subject to the provisions of Section 305 of the National Aeronautics and Space Act of 1958(72 Stat. 435: 42 U.S.C. 2457).

BACKGROUND OF THE INVENTION

1. Field of the Invention

The present invention relates to process surveillance and more particularly to a distributed system for analyzing data collected by reviewing work documents, inspecting work areas and passively observing work in progress.

2. Description of the Related Art

Present process surveillance systems typically have problems related to the constant manual input of data. Process surveillance systems generally utilize clipboards or some form of electronic device to collect process data. The collected process data then has to be manually entered into a spreadsheet or database. Once the data is entered, it has to be organized so that it can be charted and graphed. Reports need to be created manually as well. The manual entering and creation of charts, graphs, and reports takes considerable man-hours to accomplish.

In order to share the collected process data, a copy of the file needs to be exchanged. Any changes to the original file does not appear in copies of the data file, thus creating discrepancies among the collected data.

To collect process data, observation criteria information is needed to guide the inspector in what to observe. Changes to the observation criteria information often take considerable time to become available to the inspector. Time delays also occur when requirements or changes to the process take place.

U.S. Pat. Nos. 5,764,509 and 6,181,975, both issued to Gross, et al., and both entitled, "Industrial Process Surveillance System" disclose a system and method for monitoring an industrial process and/or industrial data source. The system includes generating time varying data from industrial data sources, processing the data to obtain time correlation of the data, determining the range of data, determining learned states of normal operation and using these states to generate expected values, comparing the expected values to current actual values to identify a current state of the process closest to a learned, normal state; generating a set of modeled data, and processing the modeled data to identify a data pattern and generating an alarm upon detecting a deviation from normalcy. This system does not appear to be random in any fashion and may therefore be inadequate for statistical analysis purposes.

U.S. Pat. No. 5,765,138, issued to Aycock, et al., entitled, "Apparatus and Method for Providing Interactive Evaluation of Potential Vendors", discloses an arrangement for providing an interactive evaluation of suppliers as proposed vendors for a project. A supplier evaluation system comprises a database storing a plurality of maturity requirements and recognized quality standards, and a main processing system for compiling selected standards and quality maturity requirements in accordance with project objectives. The project requirements are supplied by a communication network to a supplier in the form of an interactive supplier self-evaluation system. Alternatively, the supplier self-evaluation system may be provided to a supplier on a CD-ROM. The supplier self-evaluation system is arranged to include a plurality of objective questions corresponding to the selected maturity requirements. A supplier may selectively access local database files on the CD-ROM for information regarding the selected maturity requirements, or may remotely access the supplier evaluation system databases for supplemental information. After uploading the supplier responses to the supplier evaluation system, a supplier maturity level is calculated. An on-site supplier audit is thereafter conducted to confirm supplier responses and to obtain any additional information. Supplier approval is dependent upon a minimum supplier maturity level based upon the scored supplier responses to the maturity questions and the on-site audit. This system, like the Gross et al system described above, does not appear to be random. Furthermore, it is focused relative to the evaluation of vendors.

SUMMARY

The present invention is a distributed system for observing processes. In a broad aspect it includes a database server, an administration module, a process evaluation module, and a data display module. The administration module is in communication with the database server for providing observation criteria information to the database server. The process evaluation module is in communication with the database server for obtaining the observation criteria information from the database server and collecting process data based on the observation criteria information. The process evaluation module utilizes a personal digital assistant (PDA). A data display module in communication with the database server, including a website for viewing collected process data in a desired metrics form, the data display module also for providing desired editing and modification of the collected process data. The connectivity established by the database server to the administration module, the process evaluation module, and the data display module, minimizes the requirement for manual input of the collected process data.

The system preferably randomly determines when to collect the process data and therefore has statistical significance. This is important for determining the efficiency of the process.

Operating costs remain as one of the most significant expenditures for most companies today. If operating costs could be reduced even by a small percent, the cost savings for a company would be very substantial. The system of the present invention can thus greatly reduce operating costs. Using the present system, every aspect of the process can be scrutinized to determine if it lacks consistency. Any aspect of the process found lacking consistency can be singled out and improved. Process assessment and improvement can lower operating costs in many ways. The present invention can reduce costly unexpected incidents through greater employee awareness and attention to detail. It can also be used to increase safety. Improving the process can also lower turn around time and lead to a decrease in overhead, both of which can increase a company's profits.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE INVENTION

Figure 1:
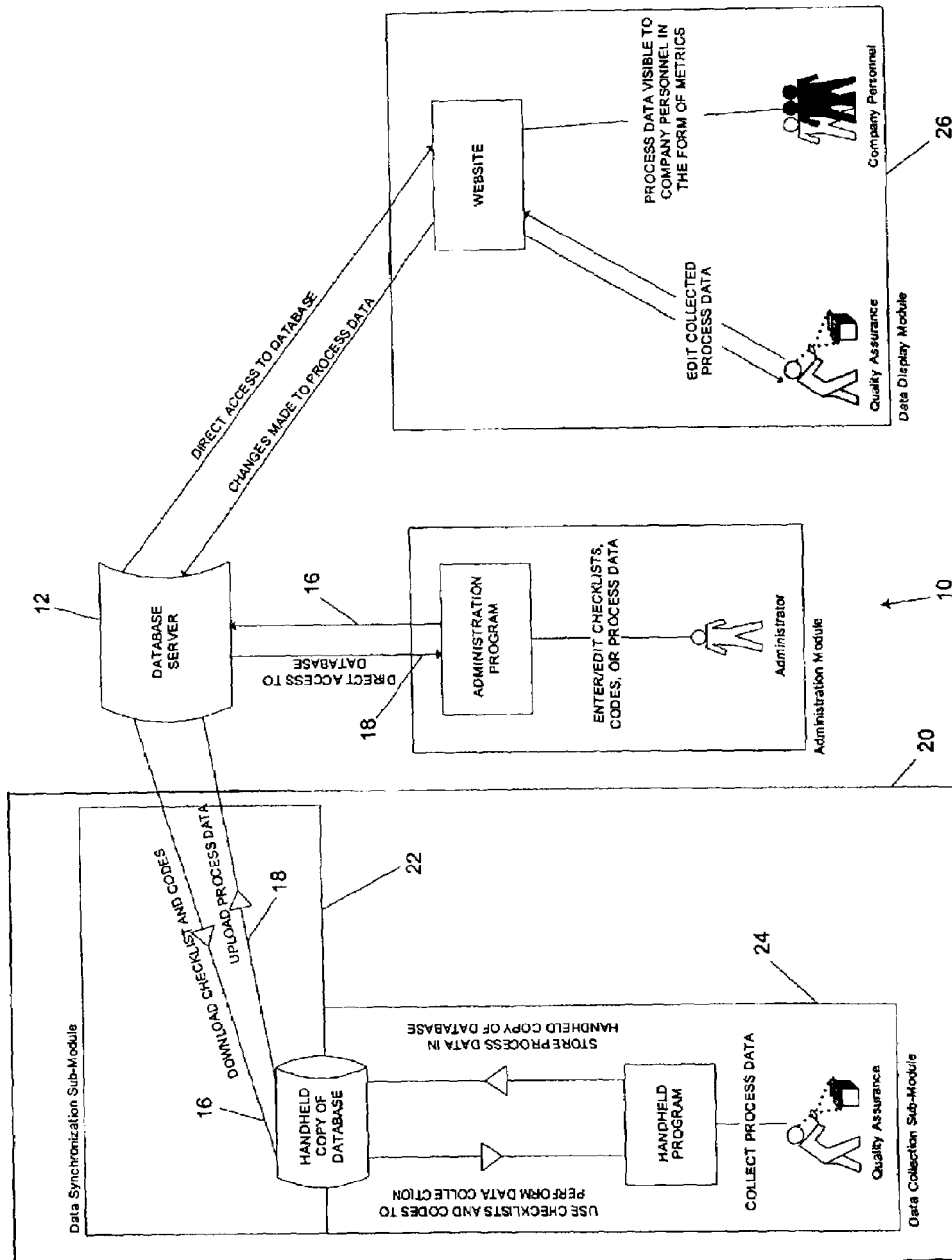
FIG. 1 is schematic flow diagram of a preferred embodiment of the present invention.

Referring now to the drawings and the characters of reference marked thereon, FIG. 1 illustrates a preferred embodiment of the distributed system of the present invention, designated generally as 10. The distributed system 10 includes a database server 12 that may use, for example, any structured query language (SQL) compliant database server (Oracle, Microsoft SQL Server, etc.).

An administration module 14 is in communication with the database server 12 for providing observation criteria information 16 to the database server 12. The administration module 14 includes a computer implementable Administration Program for providing the functions of: entering, editing and deleting observation criteria information 16; granting access to users; and, editing collected process data 18. The observation criteria information 16 may be, for example, checklists, error codes, operating procedure documents, specifications, etc. Collected process data 18, may be, for example, acceptability of the checklists, error codes associated with any failures, i.e. unacceptable checklists, etc. The Administration Program is a menu driven interface to the database server. It allows the administrator to edit the collected process data and grants access to users. It may use a commercially available programming language such as Visual Basic, or C++.

A process evaluation module, designated generally as 20, is in communication with the database server 12 for obtaining observation criteria information 16 from the database server and collecting process data 18 based on the observation criteria information 16. The process evaluation module utilizes a personal digital assistant (PDA). The PDA may be, for example, a Palm Pilot or Pocket PC compatible device.

The process evaluation module 20 preferably includes a data synchronization sub-module 22, for obtaining the observation criteria information 16 from the database server; and, a data collection sub-module 24 for collecting the process data based on the observation criteria information and for providing the collected process data 18 to the data synchronization sub-module 22 for uploading to the database server 12. Sub-modules 22 and 24 will be discussed in detail below.

A data display module 26 is in communication with the database server. The data display module 26 includes a website for viewing collected process data 18 in a desired metrics form. The data display module 26 also provides a desired editing and modification of the collected process data 18. The views preferably include filtered views including graphs, charts, plots, and tables.

The data display module 26 allows users to edit their own collected process data 18. This gives the user access to resources for researching process data findings. This also gives the user access to a keyboard and spell checking capabilities.

The data display module 26 preferably includes the capability of generating a random schedule for determining when to collect process data. For example, this may be done at the beginning of every week.

Figure 2:
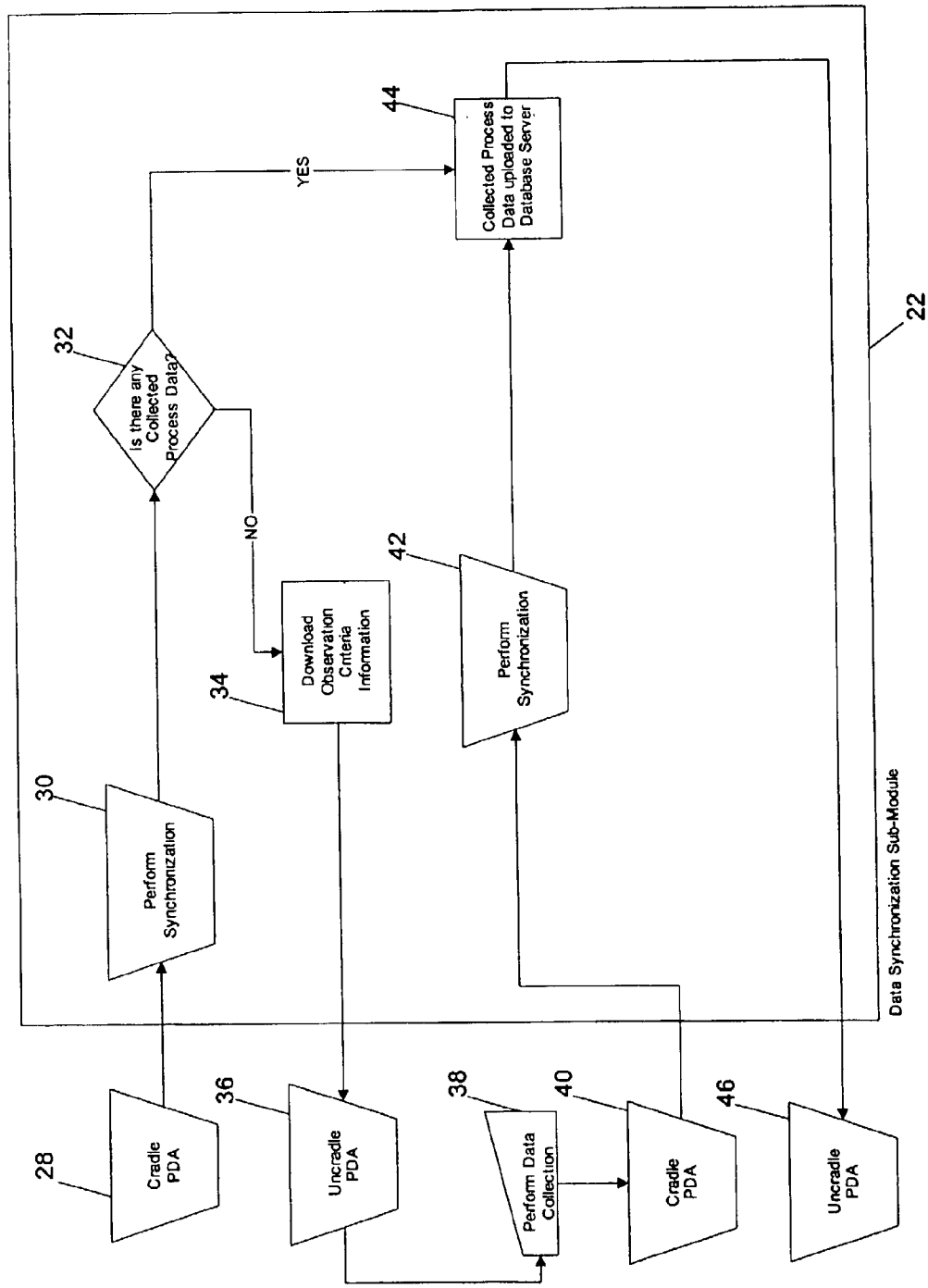
FIG. 2 is a flow diagram of the data synchronization sub-module of the process evaluation module of the present invention.

Referring now to FIG. 2, the data synchronization sub-module 22 is shown in relation with user functions and the cradling/uncradling of the PDA. The sub-module 22 includes a computer implementable program for providing a series of steps. First, the PDA is cradled, as noted by block 28. A synchronization program is executed (30) for obtaining of the observation criteria information 16 from the database server 12. There is an attempt to download the observation criteria information 16 from the database server 12. There is a determination 32 made as to if there is any collected process data 18.

Observation criteria information 16 is downloaded to the data collection sub-module 24 if there is no collected process data 18, as indicated by numeral designation 34. In such an instance, the PDA is uncradled (36), data is then collected (38), and the PDA is then cradled (40). A synchronization is then performed, as indicated by numeral designation 42. The collected process data 18 is then uploaded to the database server 12 (see block 44).

If there is collected process data 18 the user is prompted to upload the collected process data 18. The PDA is then uncradled (46).

Figure 3:
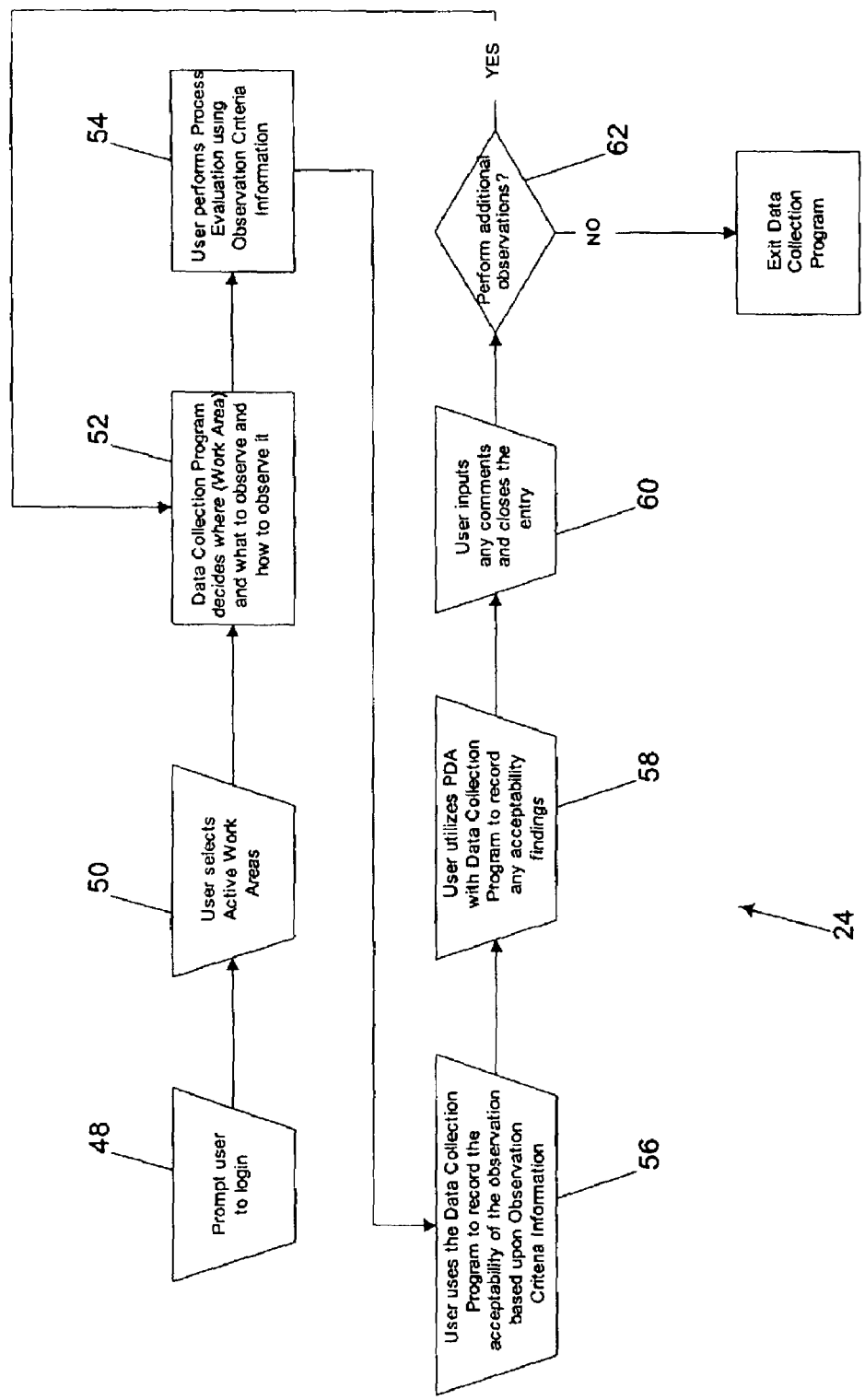
FIG. 3 is a flow diagram of the data collection sub-module of the process evaluation module of the present invention.

Referring now to FIG. 3, the data collection sub-module 24 is illustrated. Sub-module 24 includes a computer implementable Data Collection Program (DCP). The DCP 24 prompts a user to login (48) and to select (50) at least one Active Work Area. Typically several Active Work Areas are selected. An active work area is a location in which processing work is being conducted, usually somewhere, for example, on a shop floor.

One of the selected Active Work Areas is preferably randomly chosen (52) and the observation criteria information 16 is also preferably randomly chosen (54). Thus, the user is allowed to gather the collected process data 18. The DCP 24 decides where (i.e. the Work Area), what to observe, and how to observe it.

The acceptability of the collected process data 18 is recorded based upon the observation criteria information 16, as shown by block 56. Thus, the user is able to utilize his PDA to record acceptability findings and to input comments, as shown by blocks 58, 60.

A determination (62) is made as to whether additional observations may be made to gather additional collected process data. Such additional gathering may be made by repeating the above steps.

The following illustrates the utilization of the present invention relative to rocket engine processing: At the beginning of the week, usually on Mondays, a Process Evaluation Observation Schedule is randomly generated for Space Shuttle Main Engine (SSME) processing. This schedule consists of 8 two-hour observation periods evenly divided among first and second shift. During the week when it is time to perform an observation, the PDA is cradled and a copy of the observation criteria information 16 is downloaded. This ensures that the PDA has the most up to date information. After the download is complete, the PDA is uncradled and the observation period can begin. The Data Collection Program (DCP) 24 is started. The DCP 24 prompts the inspector to login (48) to the system and select (50) Active Work Areas. Active Work Areas are the locations around the Kennedy Space Center (KSC) in which SSME processing is currently taking place. Once the inspector is logged in and the Active Work Areas have been set, the DCP 24 randomly selects (52) one of the Work Areas for the inspector to perform his/her observation.

The DCP 24 also randomly selects what the inspector will observe; in the case of SSME processing this will include in-process work, documentation, and work area compliance. If there are multiple processing tasks being performed at the randomly selected Work Area, the DCP (24) will randomly select one of the tasks. The DCP 24 presents the inspector with the randomly selected observation criteria information (54), which is essentially a checklist to be used as a guideline for performing the observation. In SSME processing, the checklist will include items to ensure proper safety, the established procedures are being followed, and the proper documentation is being used. Each checklist item's acceptability is determined (56). If a checklist Item is determined to be unacceptable, further steps are taken to document the violation (58). Error codes that have been previously entered through the Administration Program are now available for assignment to the violation. The inspector can also determine which regulatory document has been violated. When the observation is completed, the inspector has the ability to enter any additional comments into the PDA (60). These steps are repeated until the two-hour observation period is over (62). Once the two-hour observation period is complete, the inspector cradles the PDA and uploads the collected process data (40, 42, 44). The collected process data is now available to the inspector to edit through the website 26. This gives the inspector access to a keyboard and spell check capabilities. Once the inspector is satisfied with the edited collected process data, the inspector saves the changes and the collected process data becomes available for use in metrics. The collected process data can now be categorized in many different ways to try and determine the life and efficiency of the process. The collected process data 18 can also be entered into reports and used for presentations.

Although the present system 10 has been described with application to rocket engine processing, the system was designed to be generic so that it could be used in any manufacturing or processing environment. For example, it is particularly adaptable for use within the automotive, aerospace, airline, and other manufacturing industries. The system provides instant and ongoing feedback regarding the life of the observed process. The cost for this system should be considerably less than that charged by auditing agencies. The user interfaces are very user friendly and easy to understand. For example, the programs used in this system preferably provide pull-down menus, checkboxes, and simple displays.

Obviously, many modifications and variations of the present invention are possible in light of the above teachings. It is, therefore, to be understood that within the scope of the appended claims, the invention may be practiced otherwise than as specifically described.

The invention claimed is:

1. A distributed system for observing processes, comprising:
   a database server;
   an administration module in communication with said database server for providing observation criteria information to said database server;
   a process evaluation module in communication with said database server for obtaining said observation criteria information from said database server and collecting process data based on said observation criteria information, said process evaluation module utilizing a personal digital assistant (PDA); and
   a data display module in communication with said database server, including a website for viewing collected process data in a desired metrics form, said data display module also for providing desired editing and modification of said collected process data;
   wherein the connectivity established by said database server to said administration module, said process evaluation module, and said data display module, minimizes the requirement for manual input of said collected process data;
   wherein said process evaluation module, comprises:
   a data synchronization nib-module for said obtaining of said observation criteria information from said database server; and
   a data collection sub-module for said collecting of said process data based on said observation criteria information and for providing said collected process data to said data synchronization sub-module for uploading to said database sewer; and
   wherein said data synchronization sub-module comprises a computer implementable program for providing the steps of:
   executing a synchronization program for said obtaining of said observation criteria information from said database server;
   attempting to download said observation criteria information from said database server determining if there is any of said collected process data;
   downloading said observation criteria information to said data collection sub-module if there is no collected process data) and providing a synchronization, said collected process data being uploaded to said database server;
   prompting a user to upload said collected process data if there is collected process data; and
   uploading said collected process data obtained from said downloading and prompting steps if there is collected process data.

2. The distributed system of claim 1, wherein said data collection sub-module, comprises a computer implementable Data Collection Program for providing the steps of:
   a) prompting a user to login;
   b) prompting die user to select at least one Active Work Area;
   c) randomly choosing one of said selected Active Work Areas and randomly choosing said observation criteria information, thus allowing a user to gather said collected process data;
   d) recording the acceptability of said collected process data based upon said observation criteria information, thus allowing the user to record acceptability findings and to input comments; and,
   e) determining whether to gather additional collected process data, using steps c)-d), above.

3. The distributed system of claim 1, wherein said administration module, comprises a computer implementable Administration Program for providing the functions of:
   a) entering, editing and deleting said observation criteria information;
   b) granting access to users; and,
   c) editing said collected process data.

4. The distributed system of claim 1, wherein said data display module:
   a) views said collected process data in said desired metrics form, comprising filtered views including graphs, charts, plots, and tables; and,
   b) allows users to edit their own collected process data.

5. The distributed system of claim 1, wherein said process evaluation module randomly determines when to collect said process data.

6. The distributed system of claim 1, wherein said data display module includes means for determining when to collect said process data.

7. The distributed system of claim 1, wherein the process evaluation module randomly chooses, from one or more active work areas, a work area for the collection of the process data.

8. The distributed system of claim 1, wherein the process evaluation module randomly chooses, the observation criteria information to be used for the collection of the process data.

9. A distributed system for observing rocket engine processing, comprising:
   a database server;
   an administration module in communication with said database server for providing observation criteria information to said database server;
   a process evaluation module in communication wit said database server for obtaining said observation criteria information from said database sewer and collecting process data based on said observation criteria information, said observation criteria information comprising checklists for assuring proper safety and procedural compliance with rocket engine processing regulations, said process data comprising information regarding the acceptability of said checklists, said process evaluation module utilizing a personal digital assistant (PDA); and
   a data display module in communication with said database server, including a website for viewing collected process data in a desired metrics form, said data display module also for providing desired editing and modification of said collected process data;
   wherein the connectivity established by said database server to said administration module, said process evaluation module, and said data display module, minimizes the requirement for manual input of said collected process data;

10. The distributed system of claim 9, wherein said data collection sub-module, comprises a computer implementable Data Collection Program for providing the steps of:
   a) prompting a user to login;
   b) prompting the user to select at least one Active Work Area;
   c) randomly choosing one of said selected Active Work Areas and randomly choosing said observation criteria information, thus allowing a user to gather said collected process data;
   d) recording the acceptability of said collected process data based upon said observation criteria information, thus allowing the user to record acceptability findings and to input comments; and,
   e) determining whether to gather additional collected process data, using steps c)–d), above.

11. The distributed system of claim 9, wherein said administration module, comprises a computer implementable Administration Program for providing the functions of
   a) entering, editing and deleting said observation criteria information;
   b) granting access to users; and,
   c) editing said collected process data.

12. The distributed system of claim 9, wherein said data display module:
   a) views said collected process data in said desired metrics form, comprising filtered views including graphs, charts, plots, and tables; and,
   b) allows users to edit their own collected process data.

13. The distributed system of claim 9, wherein said process evaluation module randomly determines when to collect said process data.

14. The distributed system of claim 9, wherein said data display module includes means for determining when to collect said process data.

* * * * *